July 11, 1950  F. O. RYAN  2,514,519
PNEUMATIC COTTON HARVESTER
Filed Oct. 10, 1946  3 Sheets-Sheet 1
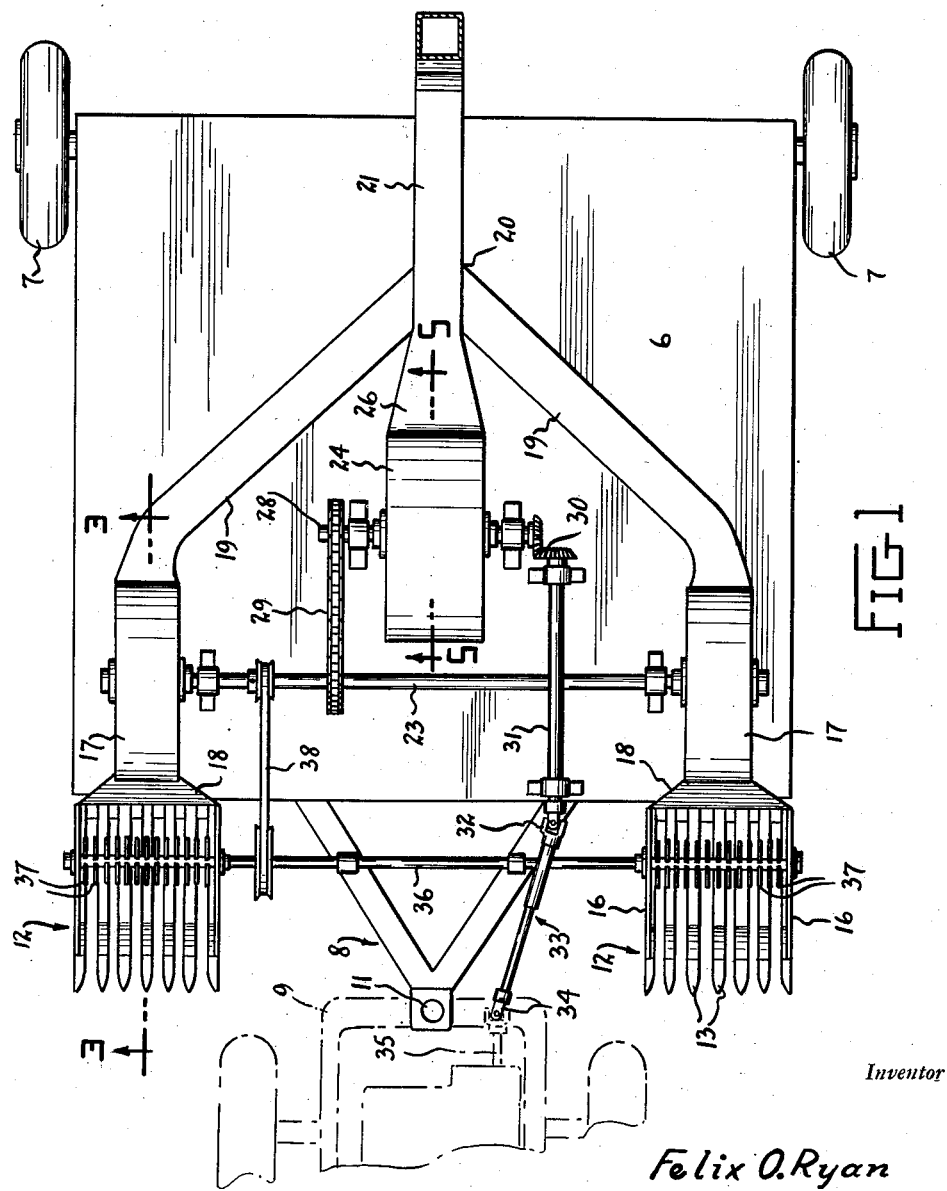
Inventor
Felix O. Ryan
By Clarence A. O'Brien
and Harvey B. Jacobson
Attorneys

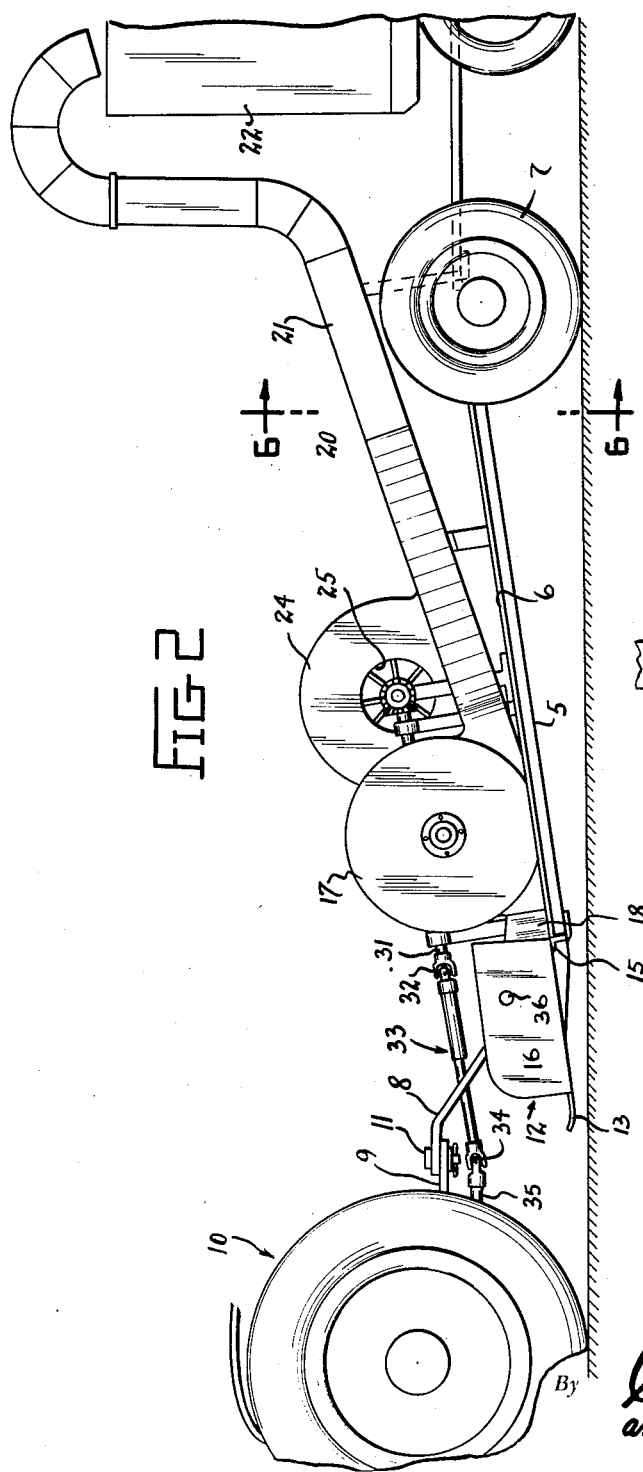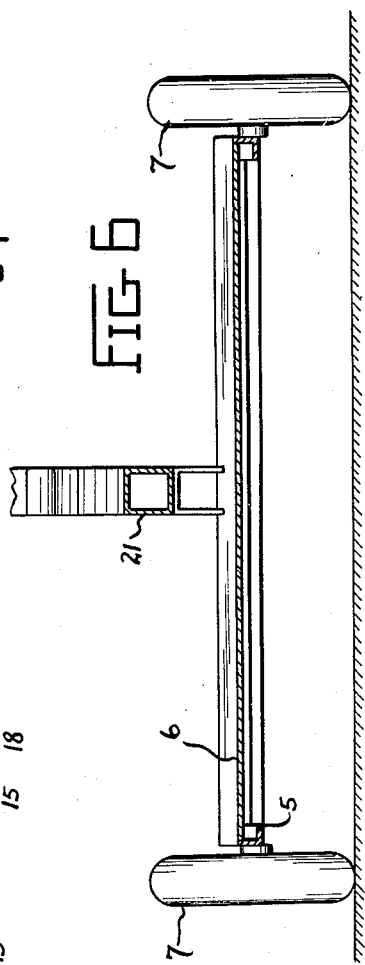

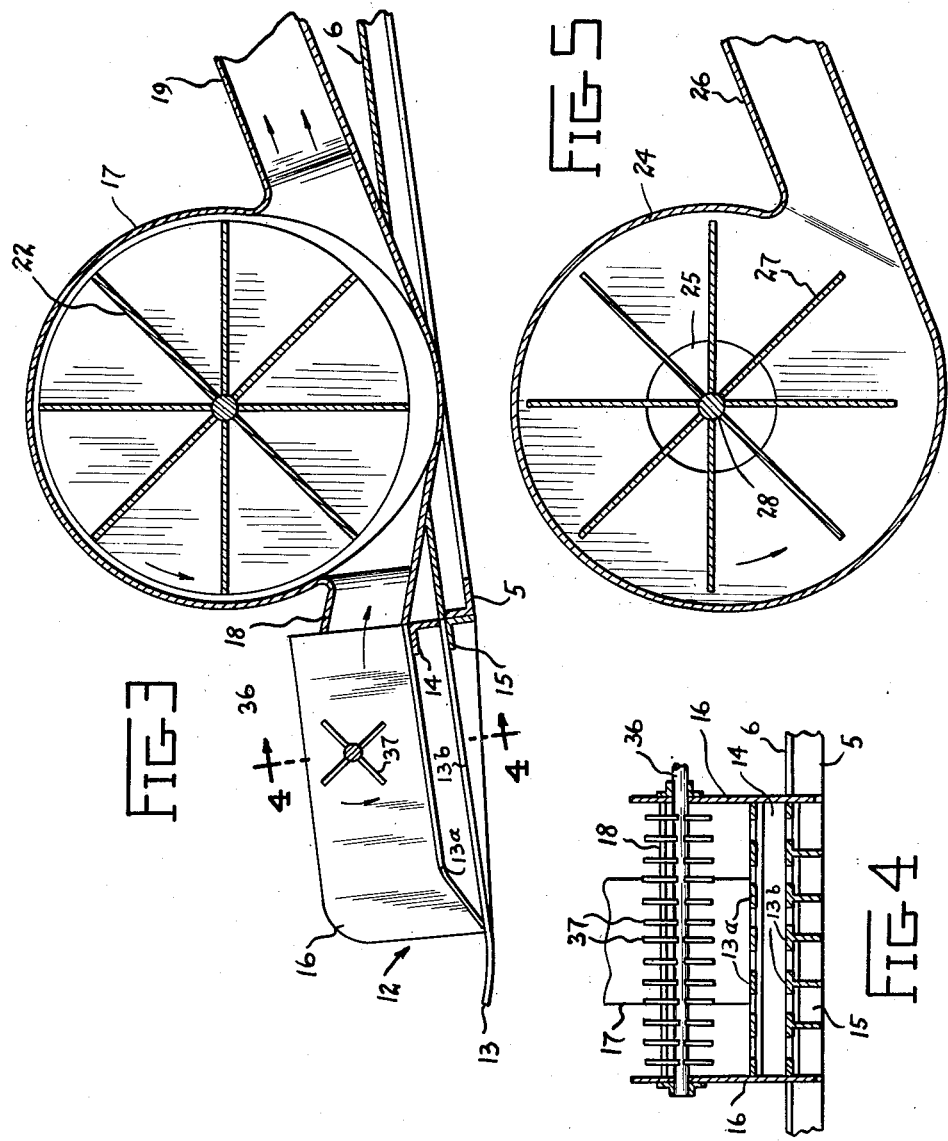

Patented July 11, 1950

2,514,519

UNITED STATES PATENT OFFICE 2,514,519

PNEUMATIC COTTON HARVESTER

Felix O. Ryan, Quitaque, Tex.

Application October 10, 1946, Serial No. 702,386

1 Claim. (Cl. 56—30)

This invention relates to a cotton harvester of the type which strips the bolls from the standing stalks and delivers them into a suitable receptacle associated and moving with the machine over the field.

An object of the present invention is to provide a simple and efficient cotton harvester of the above type adapted to be coupled to a tractor so as to be supported thereby at the front and to be drawn by the tractor over the field.

A further object of the invention is to provide a harvester of the above kind including a stripping scoop for removing the bolls from the stalks of the standing plants, a blower for receiving the bolls from the stripping scoop and delivering them rearwardly into a receptacle, means for delivering the bolls from the scoop to the blower, and means for driving the blower and the delivering means from the power take-off shaft of the tractor.

The exact nature of the invention, as well as other objects and features thereof, will become apparent from the following description when considered in connection with the accompanying drawings, in which:

Figure 1 is a top plan view, partly in section, of a cotton harvester constructed in accordance with the present invention and adapted to simultaneously operate upon standing plants in two adjacent rows;

Figure 2 is a side elevational view thereof;

Figure 3 is an enlarged fragmentary longitudinal section taken on line 3—3 of Figure 1;

Figure 4 is a fragmentary transverse section taken on line 4—4 of Figure 3;

Figure 5 is a fragmentary longitudinal section through the auxiliary blower, taken on line 5—5 of Figure 1;

Figure 6 is a transverse section taken on line 6—6 of Figure 2.

Referring in detail to the drawings, the illustrated embodiment of the invention comprises a suitable rectangular frame 5 having a platform 6 secured thereon, and provided with coaxial rear ground or supporting wheels 7. Rigid with and projecting forwardly from the front of the frame 5 centrally between the sides thereof is a tongue 8 that extends forwardly and upwardly as shown in Figure 2 and is adapted to rest upon the draw bar 9 of a tractor 10 and to be coupled to said draw bar as at 11. In this way, the front of the frame 5 is supported at the desired position above the surface of the ground by the tractor draw bar, and the tractor is adapted to tow or draw the harvester over the field.

Stripping scoops 12 are rigidly mounted on the front of the frame 5 near opposite sides thereof, said scoops being arranged to move along adjacent rows of standing cotton plants upon forward travel of the machine. Each stripping scoop has a bottom composed of spaced tines 13 adapted to receive the stalks of the plants therebetween below the bolls and to strip the latter from the stalks upon forward travel of the machine. As shown more clearly in Figures 3 and 4, each tine 13 preferably includes spaced upper and lower members 13a and 13b joined near the front ends of the members 13b and secured to cross bars 14 and 15 at their rear ends, the upper members 13a being in the form of flat strips and the members 13b being of T-shape in cross section so as to have considerable strength and rigidity. Rising from the outermost tines are side plates 16 which confine the bolls on the tines until delivered rearwardly therefrom.

A main fan blower 17 is mounted on the platform 6 directly behind each scoop 12 and has an intake mouth 18 forming the back of the associated scoop. Each blower has a discharge pipe 19, and these discharge pipes extend rearwardly in converging relation and are joined together at 20 to form a single rear portion 21 that extends upwardly and rearwardly for discharging the bolls into a receptacle 22 associated with and moving with the harvester. This receptacle may consist of a trailer vehicle suitably hitched to the rear of the harvester as shown in Figure 2. The blowers 17 include casings within which are rotatably mounted fans 22 having transverse shafts connected by a transverse drive shaft 23.

A third auxiliary blower 24 is mounted on the platform 6 midway between the blowers 17 and rearwardly of drive shaft 23, said blower 24 having side inlets 25 and a peripheral outlet pipe 26 connected to the discharge pipes 19 where they join at 20. The blower 24 is located nearer the discharge end of pipe portion 21 than the blowers 17, and assist the latter in effectively discharging the bolls into the receptacle 22. Blower 24 has a fan 27 mounted on a transverse shaft 28 which is operatively connected to the drive shaft 23 by suitable means such as a sprocket chain gearing 29. The shaft 28 is also geared at 30 to a longitudinal shaft 31 journaled on the platform 6 and extending from the blower 24 to the front of the platform 6 where it is connected by a universal joint 32 to a telescopic extensible shaft 33 adapted to be coupled by a universal joint 34 to the power take-off shaft 35 of the tractor 10.

A further transverse shaft 36 is journaled on the tongue 8 and has its end extended across the scoops 12 above the tines 13 and journaled in the plates 16. Each end of shaft 33 carries a longitudinal series of radial fingers 37 between the sides of the associated scoop. The fingers 37 act to deliver the detached bolls from the scoops to the associated blowers 17 upon rotation of shaft 36 in the direction of the arrow shown in Figure 3, the fingers 37 operating within the scoops above the tines thereof. Power is transmitted to shaft 36 from shaft 23 by a suitable driving connection such as a belt gearing 38. It will be understood that the tongue 8 is so arranged and formed as to support the forward ends of the tines 13 the proper distance above the surface of the ground to engage the plant beneath the bolls. It will be seen that the fan or blower 24 is driven from the power take-off shaft 35 of the tractor, and power is transmitted from this shaft 28 to the shafts 23 and 36 so as to drive the blowers 17 and to rotate shaft 36 and the fingers 37 carried thereby.

Upon forward travel of the tractor, the harvester is drawn forwardly thereby so that the scoops 12 engage the standing plants in adjacent rows. As the machine travels ahead, the stalks of the plants pass rearwardly between the tines 13 of the scoops and the bolls are ultimately stripped from the stalks of the plants by reason of the fact that the tines 13 are sufficiently close together to prevent passage of the bolls downwardly therebetween. The rotating fingers 37 then deliver the detached bolls rearwardly to the blowers 17 so that the latter will forcibly discharge the bolls into the receptacle 22 with the assistance of the auxiliary blower 24. Use of the blower 24 permits use of blowers 17 of minimum size and assures positive discharge of the bolls into the receptacle 22 so that the discharge pipes will not become clogged.

From the foregoing description, it is believed that the construction, operation and advantages of the present invention will be readily understood and appreciated by those skilled in the art. It will be apparent that the machine is very simple in construction, efficient, and easy to use. Modifications and changes in details of construction are contemplated, such as fall within the scope of the invention as claimed.

What I claim is:

A two row cotton harvester comprising a frame having rear ground wheels, means to couple the forward end of the frame to and support the same upon the rear of a tractor, forwardly inclined stripping scoops mounted in spaced side by side relation on the front of the frame in position to move along adjacent rows of standing cotton plants, a fan blower mounted on the frame directly behind each scoop and having an intake mouth forming the back of the latter, a discharge pipe extending rearwardly from each blower, said discharge pipes converging rearwardly and joined together at their rear ends, an auxiliary blower mounted on the frame between and rearwardly of the first named blowers and having a discharge pipe connected with the first named discharge pipes where they join, said discharge pipes merging to a single rear pipe portion, means to drive the fan of said auxiliary blower from the power take-off shaft of a tractor, a transverse shaft connecting the fan shafts of the first named blowers, and a driving connection between the fan shaft of the auxiliary blower and said transverse shaft.

FELIX O. RYAN.

REFERENCES CITED

The following references are of record in the file of this patent:

UNITED STATES PATENTS

| Number | Name | Date |
|---|---|---|
| 779,129 | McEachern | Jan. 3, 1905 |
| 1,032,115 | Cook | July 9, 1912 |
| 1,576,904 | Francis | Mar. 16, 1926 |
| 1,842,737 | Tharp | Jan. 26, 1932 |
| 2,085,046 | Rust et al. | June 29, 1937 |
| 2,208,731 | Pool et al. | July 23, 1940 |
| 2,445,162 | Wallace | July 13, 1948 |